US009482451B2

(12) United States Patent
Vaisman et al.

(10) Patent No.: US 9,482,451 B2
(45) Date of Patent: Nov. 1, 2016

(54) ADAPTIVE TRANS-CRITICAL $CO_2$ COOLING SYSTEMS FOR AEROSPACE APPLICATIONS (71) Applicants: Igor Vaisman, Carmel, IN (US); Douglas J. Snyder, Carmel, IN (US); Patrick C. Sweeney, Indianapolis, IN (US)

(72) Inventors: Igor Vaisman, Carmel, IN (US); Douglas J. Snyder, Carmel, IN (US); Patrick C. Sweeney, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 287 days.

(21) Appl. No.: 14/109,416

(22) Filed: Dec. 17, 2013

(65) Prior Publication Data
US 2014/0366563 A1 Dec. 18, 2014

Related U.S. Application Data (60) Provisional application No. 61/785,900, filed on Mar. 14, 2013.

(51) Int. Cl.
F25B 11/00 (2006.01)
B64D 13/06 (2006.01)
F25B 9/06 (2006.01)
(Continued)

(52) U.S. Cl.
CPC ............... *F25B 11/00* (2013.01); *B64D 13/06* (2013.01); *F25B 1/005* (2013.01); *F25B 9/008* (2013.01); *F25B 9/06* (2013.01); *F25B 29/003* (2013.01); *F25B 41/00* (2013.01); *B64D 2013/0644* (2013.01); *B64D 2013/0648* (2013.01); *B64D 2013/0674* (2013.01); *F25B 1/10* (2013.01); *F25B 40/00* (2013.01); *F25B 2309/061* (2013.01); *F25B 2341/0011* (2013.01); *F25B 2400/13* (2013.01); *F25B 2400/23* (2013.01);
(Continued)

(58) Field of Classification Search
CPC .............. F25B 2309/061; F25B 9/008; F25B 2400/13; F25B 1/10; F25B 1/005; F25B 9/06; F25B 29/003; F25B 41/00; B64D 13/06; B64D 2013/0603; B64D 2013/0648
See application file for complete search history.

(56) References Cited

U.S. PATENT DOCUMENTS 2,963,879 A 12/1960 De Paravicini
3,153,331 A 10/1964 Rogers
(Continued)

FOREIGN PATENT DOCUMENTS

EP 1762491 A2 3/2007
JP 2008224118 A 9/2008

OTHER PUBLICATIONS

International Search Report PCT/US2013/078155 mailed on Oct. 17, 2014.
(Continued)

*Primary Examiner* — Allen Flanigan
*Assistant Examiner* — Filip Zec
(74) *Attorney, Agent, or Firm* — Fishman Stewart PLLC (57) ABSTRACT A cooling system includes a heat exchanger through which a refrigerant flows, and which rejects heat to a fluid, an evaporator, a first circuit having an expansion device, a second circuit having an expansion machine coupled to a compressor, and a set of valves arranged to direct the refrigerant through the first circuit, the second circuit, or both the first and second circuits based on ambient conditions.

20 Claims, 6 Drawing Sheets (51) Int. Cl.
  *F25B 9/00*   (2006.01)
  *F25B 41/00*  (2006.01)
  *F25B 1/00*   (2006.01)
  *F25B 29/00*  (2006.01)
  *F25B 1/10*   (2006.01)
  *F25B 40/00*  (2006.01)

(52) U.S. Cl.
  CPC ......... *F25B 2600/2501* (2013.01); *Y02T 50/56* (2013.01)

(56) References Cited

U.S. PATENT DOCUMENTS

| | | |
|---|---|---|
| 4,205,532 A | 6/1980 | Brenan |
| 6,644,062 B1 | 11/2003 | Hays |
| 6,647,742 B1 | 11/2003 | Neiter et al. |
| 6,694,763 B2 | 2/2004 | Howard |
| 6,698,214 B2 | 3/2004 | Chordia |
| 6,813,895 B2 | 11/2004 | Eisenhower et al. |
| 6,898,941 B2 | 5/2005 | Sienel |
| 7,000,413 B2 | 2/2006 | Chen et al. |
| 7,159,409 B2 | 1/2007 | Manole |
| 7,299,619 B2 | 11/2007 | Briesch et al. |
| 7,424,807 B2 | 9/2008 | Sienel |
| 7,621,137 B2 | 11/2009 | Aflekt et al. |
| 7,721,569 B2 | 5/2010 | Manole |
| 7,818,971 B2 | 10/2010 | Yamaguchi et al. |
| 7,818,978 B2 | 10/2010 | Ducoulombier et al. |
| 8,118,257 B2 * | 2/2012 | Wilmot, Jr. ............ B64D 13/06 244/118.5 |
| 8,196,421 B2 | 6/2012 | Bush et al. |
| 8,327,651 B2 | 12/2012 | Finney et al. |
| 8,418,482 B2 | 4/2013 | Bush et al. |
| 8,424,326 B2 | 4/2013 | Mitra et al. |
| 2003/0005718 A1 | 1/2003 | Mitani et al. |
| 2005/0103487 A1 | 5/2005 | Aflekt et al. |
| 2006/0162371 A1 | 7/2006 | Lui et al. |
| 2007/0068178 A1 | 3/2007 | Honma et al. |
| 2007/0157659 A1 | 7/2007 | McPhail |
| 2008/0302118 A1 | 12/2008 | Chen et al. |
| 2010/0031677 A1 | 2/2010 | Lifson et al. |
| 2010/0083678 A1 | 4/2010 | Lifson et al. |
| 2010/0199707 A1 | 8/2010 | Pearson |
| 2010/0281894 A1 | 11/2010 | Huff |
| 2011/0005244 A1 | 1/2011 | Finney et al. |
| 2011/0048042 A1 | 3/2011 | Chen et al. |
| 2011/0239668 A1 | 10/2011 | Qiao et al. |
| 2012/0011866 A1 | 1/2012 | Scarcella et al. |
| 2012/0036854 A1 | 2/2012 | Vaisman et al. |
| 2012/0067055 A1 | 3/2012 | Held |
| 2013/0233003 A1 | 9/2013 | Piesker et al. |

OTHER PUBLICATIONS

Int'l Search Report for PCT/US2013/067640 mailed Apr. 29, 2014.
English Abstract for JP2008224118A.

* cited by examiner

ADAPTIVE TRANS-CRITICAL CO$_2$ COOLING SYSTEMS FOR AEROSPACE APPLICATIONS

CROSS-REFERENCE TO RELATED APPLICATIONS

This application claims priority to U.S. Provisional Patent Application No. 61/785,900, filed Mar. 14, 2013, the contents of which are hereby incorporated in their entirety.

FIELD OF TECHNOLOGY

An improved method of operating a cooling system in an aerospace application is disclosed, and more particularly, an improved method of operating the cooling system includes operating in trans-critical or sub-critical modes.

BACKGROUND

It has become increasingly desirable to improve cooling systems in aerospace applications. Typically, cooling systems provide air conditioning, refrigeration and freezer services, and the like for commercial and other aerospace systems. In general, various known options are available for providing cooling, but such options have drawbacks that limit the design options for aerospace applications.

One known option includes a vapor compression cycle. Vapor compression cycles pass a refrigerant through two-phase operation and can operate efficiently and take advantage of the thermal carrying capacity of a liquid, as opposed to a gas, as well as take advantage of the heat of vaporization of the liquid refrigerant. Thus, through portions of the vapor compression cycle, the cooling system can be much more compact when compared to a gas or air-based system because the fluid being carried is in liquid form. However, vapor compression cycles typically are limited to lower ambient temperature operation and may not provide useful solutions for high ambient temperature operation.

Another known option is a single-phase gas-based system using a gas such as air as the refrigerant. However although air can serve usefully as a refrigerant medium, air is not an efficient thermal fluid, as its heat capacitance is limited to a function of its mass flow rate and heat capacity. Thus, gas-based systems are typically less efficient than vapor compression systems and are typically, for that reason alone, larger than vapor compression systems. Additionally, air systems typically include significant duct passages in order to carry the amount of air that is desired to achieve the amount of cooling typically used for aerospace purposes.

To accommodate the wide range of possible ambient operating conditions of the aircraft, cooling systems for aerospace applications typically use a gas-based system. That is, although it is desirable to reduce mass and bulk in aircraft or aerospace applications, typical cooling systems nevertheless include a more bulky and less efficient gas-based system in order to cover the range of conditions that can be experienced.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary cooling system for an aircraft application is described herein, and various embodiments thereof. A cooling system includes a heat exchanger through which a refrigerant flows, and which rejects heat to a fluid, an evaporator, a first circuit having an expansion device, a second circuit having an expansion machine coupled to a compressor, and a set of valves arranged to direct the refrigerant through the first circuit, the second circuit, or both the first and second circuits based on ambient conditions.

Another exemplary illustration includes a method of operating a cooling system that includes operating a set of valves that cause a refrigerant to pass the refrigerant through a heat exchanger, and direct the refrigerant through a first cooling circuit, a second cooling circuit, or both depending on ambient conditions. The first cooling circuit includes an expansion device and the second cooling circuit includes an expansion machine.

Figure 1:
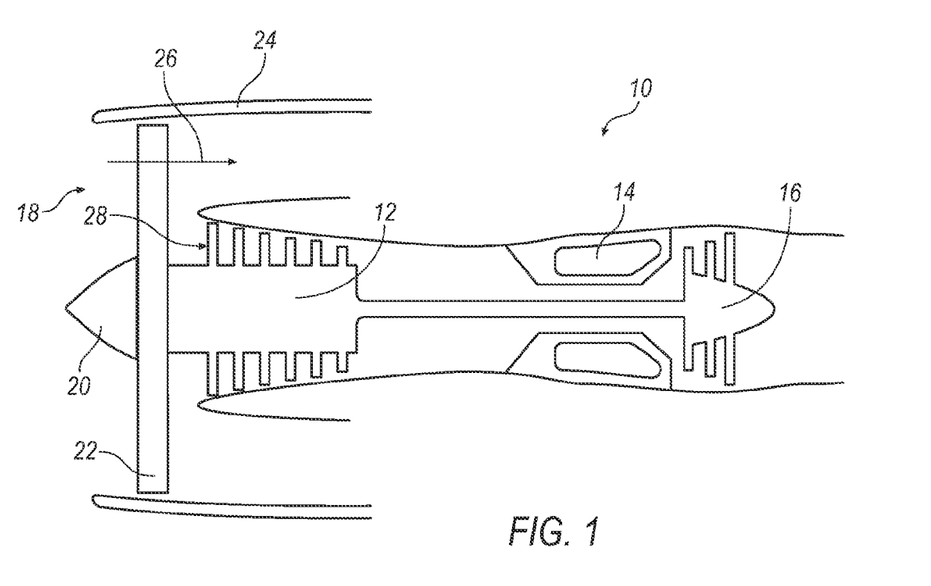
FIG. 1 is an illustration of a gas turbine engine employing the improvements discussed herein.

Turning now to the drawings, FIG. 1 illustrates a schematic diagram of a gas turbine machine 10 that is a primary mover or thrust source for an aircraft, utilizing the improvements disclosed herein. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. Components of turbine machine 10 and as illustrated in FIG. 1 generally do not correspond to components of embodiments of the cooling system in subsequent figures. That is, components of FIG. 1 generally correspond to components of an aircraft engine, whereas components in the subsequent figures (i.e., turbine, compressor) are components dedicated to the cooling systems described and are separate from the components of turbine machine 10.

Figure 2:
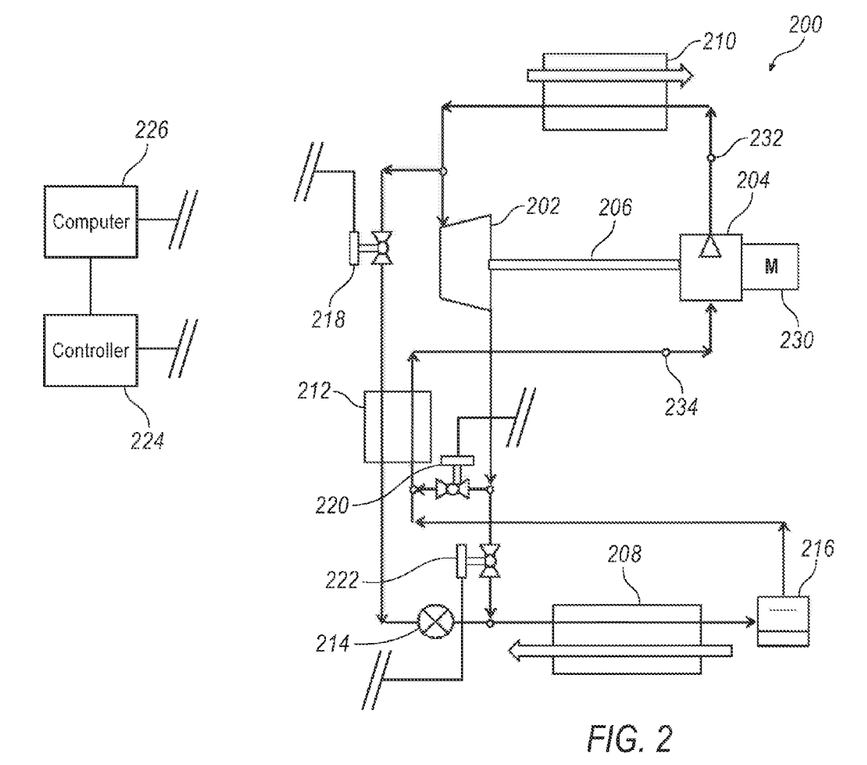
FIG. 2 is an illustration of a cooling system having optional valve-controlled refrigerant flow paths.

FIG. 2 illustrates a schematic diagram of a cooling system having valve-controlled refrigerant flow paths that are selected based on the heat rejection source and thermal loads. Cooling system 200 includes a refrigerant circuit with a compressor 204, a heat rejection exchanger 210, two parallel expansion circuits, an evaporator 208, and a suction accumulator 216. The heat rejection exchanger 210 is cooled by a cooling fluid and may operate as a condenser or a gas cooler. One expansion circuit has a valve 218, a recuperative heat exchanger 212, and an expansion device 214. The other expansion circuit with an expansion machine (expander or turbine) 202 has two lines downstream from the expander. One line having a valve 222 communicates directly with the evaporator 208. The other line feeds a low pressure side of the recuperative heat exchanger 212 and transfers its enthalpy to a high pressure stream feeding the evaporator 208 via the expansion device 214 when the valve 218 is open.

Cooling fluid states at the inlet to the heat rejection exchanger and thermal loads on the evaporator define the operating conditions of the cooling system.

The heat rejection heat exchanger 210 may be cooled by different fluids: air, fuel, RAM air, PAO, water, any secondary refrigerant, fan bypass air or any available appropriate engine stream, as examples. As such, heat is rejected from system 200 via heat rejection heat exchanger 210, and the heat rejection rate is defined by parameters of state of the cooling fluid. Parameters of state of the cooling fluid depend on the application and the fluid itself. For instance, operating conditions of the aircraft may include low static ambient temperatures and low pressures that occur when the aircraft is at high altitude, while high static ambient temperatures and pressures may occur at low altitude or at conditions on a tarmac. These static ambient pressure and temperature, Mach Number, and pressure and temperature on the ground define the parameters of RAM air entering the heat rejection exchanger.

The expansion device 214 is an orifice, a thermal expansion valve, an electronic expansion valve, a capillary tube or any other device providing isenthalpic expansion.

The expander 202 is designed as a two-phase expander which means that the leaving state is a two-phase mixture; however, expander 202 can handle single phase processes in a vapor area. Expander 202 is coupled to compressor 204 via a rotational shaft 206. The power generated in the expander 202 may not sufficient to drive the compressor. Therefore, the compressor 204 employs a motor 230 to compensate insufficient power.

A heat source for evaporator 208 is associated with objects to be cooled (power electronics, HVAC for cabins and passenger compartments, and other mission systems, as examples). The evaporator 208 may cool air in a flight deck, a passenger compartment, or electronics. Alternatively evaporator 208 can cool any of those or all of those via a coolant, which could be PAO, water, a water glycol mixture, or any other secondary refrigerant. Objects to be cooled, such as electronic devices, may be mounted on cold plates, which has channels for boiling refrigerant to execute direct cooling by the refrigerant. The system may have multiple condensers using the same or different heat sinks. Also, the system may have multiple evaporators using the same or different heat sources and loads.

The suction accumulator 216 provides charge management and is part of the capacity control strategy. When the system cooling capacity exceeds the demand, the non-evaporated refrigerant is stored in the suction accumulator 216. In the case of a capacity shortage, the accumulated refrigerant evaporates and resumes operation.

The solenoid valves 218, 220, and 222 control operation thereof. In one embodiment, cooling system 200 includes a controller 224 that in one example is controlled by a computer 226. Valves 218, 220, and 222 are controlled and direct refrigerant flow according to the ambient conditions, or operating conditions of the aircraft.

Valves 218, 220, and 222, may be actuated electrically via solenoids, pneumatically, or by any other means. There is an option when the system does not have valve 220 and its related line. In this case the recuperative heat exchanger 212 is optional. Also, there is another option when the system does not have the valve 222 and its related line.

System 200 is designed to operate at a wide operating range of pressures and temperatures in the evaporator, below and above the critical point. The system may operate at evaporator pressures below the critical point to enable execution of heat absorption and cooling duty by boiling the refrigerant in evaporator 208.

The heat rejection can be processed above or below the critical point, via selected operation of valves 218, 220, and 222. If the heat rejection process is below the critical pressure (when the cooling fluid temperature is low) then the system operation is sub-critical and the heat rejection exchanger operates a condenser. Otherwise, when the cooling fluid temperature is high, the heat rejection exchanger operates a gas cooler, the system implements a trans-critical cycle providing that the evaporating pressure is still below the critical pressure.

During transient processes a combination of a load on the evaporator and cooling fluid temperature and heat rejection capability may move the evaporating pressure up above the critical point. In such cases the evaporator operates as a single phase heat exchanger, and these are the cases when the system operation is supercritical.

When cooling fluid temperature is high and pressure in the heat rejection exchanger is above the critical one, the isenthalpic expansion in the expansion valve 214 itself may not contribute a feasible cooling effect and the expansion in the expander 202 is dominant. If pressure in the evaporator is above or around the critical pressure (the supercritical mode) the valves 218 and 220 are closed; and valve 222 is open. If pressure in the evaporator is sufficiently below the critical pressure (trans-critical mode) the valves 218 and 220 are opened and the valve 222 is closed to avoid circulation of excessive amount of vapor through the evaporator and associated excessive refrigerant pressure drop.

When cooling fluid temperature is low enough to drive the compressor discharge pressure below the critical pressure the contribution of the expander degrades, the solenoid valves 220 and 222 may be closed. This occurs when the thermodynamic state leaving the expansion device 214 contains a feasible amount of liquid phase, or in other words, when the vapor quality of the refrigerant entering the evaporator is adequately low.

Thus, a control strategy is based upon pressures and vapor quality entering the evaporator.

One capacity control strategy includes sensing a refrigerant pressure on the high pressure side, a refrigerant temperature at the inlet to the expansion device 214, and a refrigerant pressure on the low pressure side. The pressure on the high side and the temperature at the inlet to the expansion device 214 define refrigerant enthalpy entering the evaporator; this enthalpy and the low side pressure define refrigerant vapor quality entering the evaporator.

In general, this control strategy includes appropriately positioned pressure (232 and 234) and a temperature sensor (not shown) at the inlet to the expansion valve 214. The sensors 232, 234 may shut the system off when the discharge pressure is above of a set head pressure limit or suction pressure is below a set suction pressure limit.

To distinguish supercritical operation the pressure sensor 234 is positioned on the suction side of compressor 204 (in systems having LP and high pressure HP compressors, it is typically the suction side of the LP compressor that is of controlling interest). If the evaporating pressure is above the critical pressure (or is slightly lower), solenoid valves 218, 220 are off and the system implements a supercritical cycle, particularly, a Brayton Cycle system, and a single phase stream leaving the expander feeds the heat exchanger 208.

The sensor 232 distinguishes trans-critical and sub-critical operation. Under low temperature cooling fluid conditions (i.e., in flight and at high elevation at temperatures where a refrigerant such as $CO_2$ may be a liquid), first valve 218 is open and second and third valves 220, 222 are closed to direct refrigerant flow through expansion valve 214 as a liquid (sub-critical operation). Under high temperature cooling fluid conditions (i.e., when the aircraft is parked or during low elevation flight, or during transition to high elevation and at temperatures where a refrigerant such as $CO_2$ is a gas) and thermal loads driving the pressure in the evaporator above the critical point, operation is altered to direct the refrigerant flow through expander 202 (supercritical operation) and valves 218, 220 are off. At other conditions (trans-critical operation) valves 218 and 220 are on and the valve 222 is off when the vapor quality is not low enough; the valve 218 is on and the valves 220 and 222 are off when the vapor quality is low enough.

Further, when expander 202 is operated as described and as it expands refrigerant therein, because of its rotational coupling to compressor 204, compressor 204 is thereby operated and driven by expander 202 in addition to the power input provided by an electrical drive. However, when expander 202 is bypassed (decoupled from the compressor and not rotated) and liquid refrigerant is passed to expansion device 214, compressor is thereby driven by an electrically driven motor 230 only.

$CO_2$ (carbon dioxide), which enables the trans-critical, sub-critical, and super-critical operation, is therefore a refrigerant of choice for use with system 200. It will be appreciated that another trans-critical, sub-critical and super-critical refrigerant could be employed. If there is a need to elevate the critical point and extend the two phase region in order to improve the overall system performance a $CO_2$ based mixture (such as $CO_2$ and propane) may be selected as a refrigerant. As such, $CO_2$ serves as a refrigerant that spans the range of operating conditions that may be experienced as changing ambient conditions of, for instance, the aircraft. Exiting the heat rejection exchanger $CO_2$ is a gas when the temperature and pressure are above the critical ones and is a liquid when the temperature and pressure are below the critical ones. When passed through first valve 218 to expansion device 214, $CO_2$ is in gaseous form (provided that the pressure after expansion is above the critical point) or in two-phase form (provided that the pressure after expansion is below the critical point). When passed through expander 202 with first valve 218 closed and as described above, $CO_2$ is in gaseous form (provided that the pressure after expansion is above the critical point) or in two-phase or vapor form (provided that the pressure after expansion is below the critical point).

Figure 3:
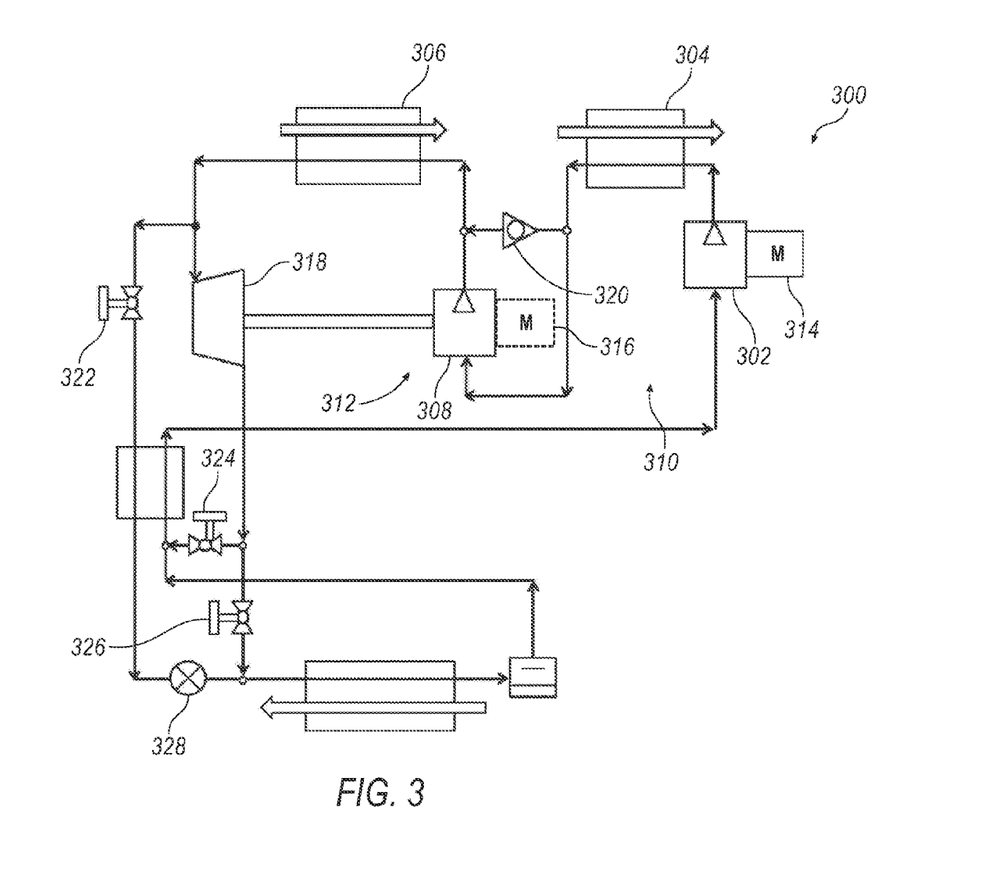
FIG. 3 is an illustration of a cooling system having a second compressor.

FIG. 3 illustrates a schematic diagram of an alternative cooling system having valve-controlled refrigerant flow paths that are selected based on ambient conditions or the operating conditions of the aircraft, according to another embodiment. Cooling system 300 operates in a fashion similar to that of cooling system 200 of FIG. 2, but the single stage compression is replaced by a two-stage compression. The two-stage compression may be implemented by a two-stage compressor or by a combination of a low pressure compressor and a high pressure compressor. The two-stage compression provides an opportunity to drive one compressor stage by the expander and other compressor by an electrical motor, such as motor 314. In one example, the low pressure compression stage, the high pressure compression stage, the expander, and the motor are sitting on the same shaft.

The cooling system includes a low pressure compressor 302, a high pressure compressor 308, and a gas cooler 304 in addition to those of FIG. 2. The gas cooler 304 (as the heat rejection exchanger 306) may be cooled by fuel, air, RAM air, PAO, water, or any other secondary refrigerant, fan bypass air, or any available appropriate engine stream. The expander 318 drives the high pressure compressor 308 and the low pressure compressor 302 is driven by an electrical motor. Alternatively, it is possible to arrange that the low pressure compressor is driven by the expander and the high pressure compressor is driven by the motor (illustrated as element 316 as dashed lines).

The heat rejection exchanger 306, comparable in location to that of heat rejection exchanger 210 of FIG. 2, may nevertheless differ in design and operation because of the two-stage heat rejection design of cooling system 300. Also, the heat rejection heat exchanger 306 may be combined with the gas cooler 304 and operate as one device. Similarly, a compressor 308 is positioned in a location that is comparable to compressor 204 of FIG. 2.

Operation of cooling system 300 is therefore two-stage in that refrigerant passes through compressor 302 in a first stage of compression 310, heat is rejected to gas cooler 304, and refrigerant is passed to the compressor 308 in a second stage of compression 312 before entering heat rejection heat exchanger 306. The compressor 302 is therefore designated as a low pressure (LP) compressor and the compressor 308 is a high pressure (HP) compressor, due to the pressures in their relative locations in the system 300.

In one embodiment a check valve 320 may be included to enable bypassing the compressor that is driven by the expander at certain combinations of low cooling fluid temperatures and thermal loads on the evaporator.

Cooling system 300 is operated in a fashion similar of system 200, but with the two stages of compression 310, 312 as discussed. System 300 is therefore operable via valves 322, 324, and 326 in the fashion as described in order to selectively operate expansion devices such as expander 308 and expansion device 328, depending on sub-critical, trans-critical, or super-critical operation.

Figure 4:
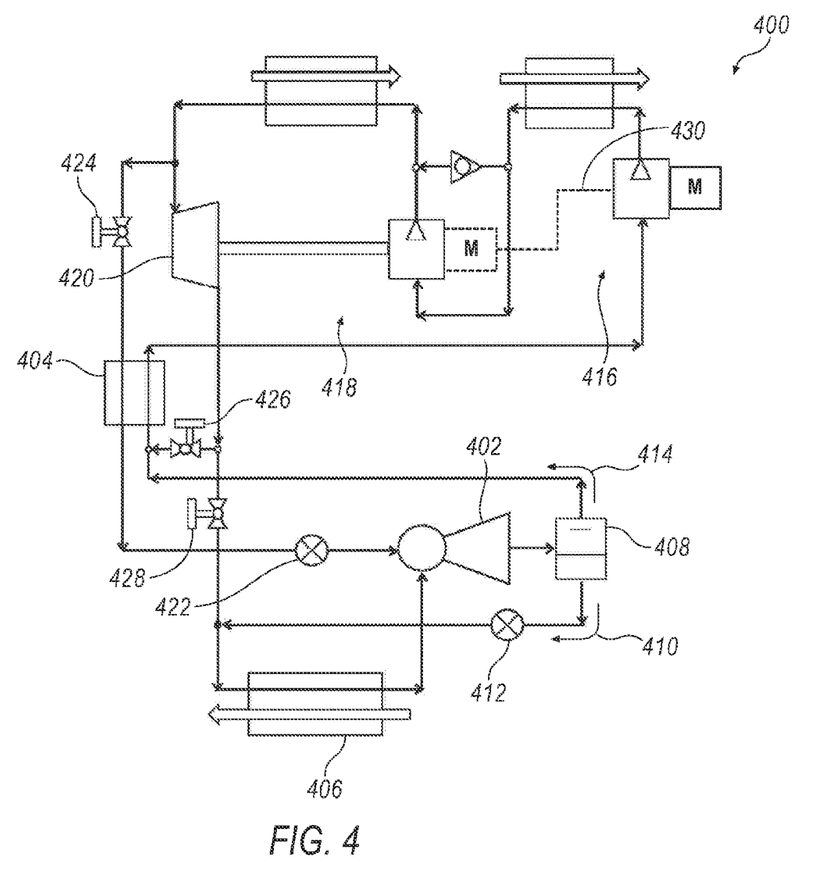
FIG. 4 is an illustration of a cooling system having an ejector for operating as a booster compressor.

FIG. 4 illustrates a schematic diagram of an alternative cooling system having valve-controlled refrigerant flow paths that are selected based on the ambient conditions or operating conditions of the aircraft. Cooling system 400 operates in a fashion similar to that of previously described cooling systems 200, 300, but includes an ejector 402 for boosting compression of the refrigerant before the refrigerant passes to the subsequent compression cycle(s). The ejector 402 is fed by a high pressure refrigerant stream when a solenoid valve 422 is open. This stream is a motive stream. The ejector expands the motive stream and using the energy of the motive stream drives/eject a low pressure stream from evaporator 406. The ejector discharges the refrigerant stream at a pressure higher than the evaporating pressure to a liquid separator 408 in which liquid is extracted 410, passed to expansion device 412 and then to evaporator 406. Refrigerant also passes from liquid separator 408 as a stream or vapor 414 and then passes to first stage compression 416 and to second stage compression 418, as described above with respect to cooling system 300. According to one embodiment, system 400 includes optional expansion device 422 that provides refrigerant expansion prior to entering ejector 402.

In addition to liquid separation function the liquid separator provides the charge management for capacity control instead of the suction accumulator. Thus, ejector 402 operates as an expansion device and a boost compressor, which boosts gas pressure prior to entering first stage 416, and leading to an overall decreased pressure differential across the compression stages, improving overall performance. System 400 is therefore operable via valves 424, 426, 428 in the fashion as described in order to selectively operate expansion devices, such as expander 420 and expansion device 422, depending on sub-critical, trans-critical, or super-critical operation.

Further, it is contemplated that ejector 402 may be used in a cooling system having, for instance, only a single stage of compression. For instance, as described above system 200 of FIG. 2 includes a single stage of compression, and thus in one embodiment ejector 402 as described with respect to system 400 of FIG. 4 may be included in systems in which one stage of compression is included. In addition, according to one alternative, both compressors may be coupled to one another through a shaft that is common to expansion device 420. In one example, system 400 includes a recuperative heat exchanger 404.

Figure 5:
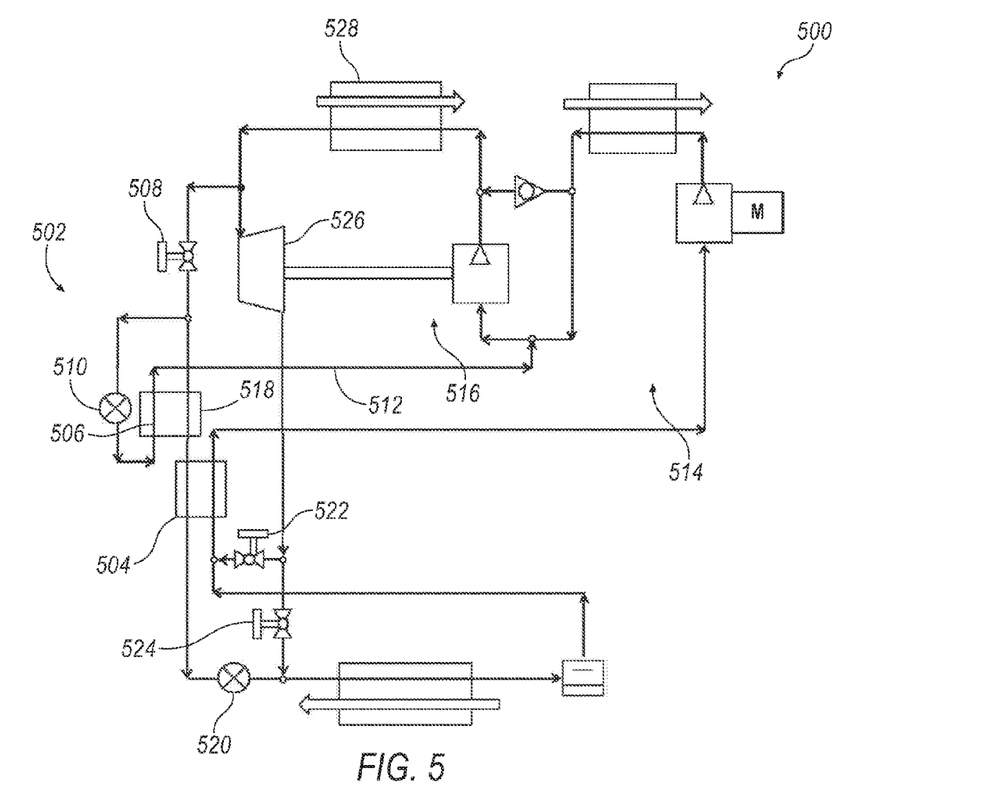
FIG. 5 is an illustration of a cooling system having a secondary expansion loop.

Referring to FIG. 5, an alternative cooling system 500 includes an economizer cycle 502 in which, in addition to recuperative heat exchanger 504 as in previous systems, a second recuperative heat exchanger 506 is included. The refrigerant, having passed through valve 508, is expanded in a separate expansion device 510, is passed through second recuperative heat exchanger 506, and is passed as an additional vapor line 512 to combine with refrigerant passing from first stage compression 514 to second stage compression 516. As such, overall system performance is improved as a portion of refrigerant stream passing through valve 508 is expanded in device 510, and passed through second recuperative heat exchanger 506 such that its component 518 is cooled yet further prior to entering heat exchanger 504 and expansion device 520. The second recuperative heat exchanger 506 enables additional cooling of high pressure stream which improves cooling capacity of the system recompressing refrigerant from intermediate pressure to high pressure. Economizer cycle 502 thus enhances the conditions for overall system cooling when valves 508, 522, and 524 are operated to bypass expander 526, increasing the refrigerant flow for heat rejection in condenser cooler or condenser 528.

The illustrated embodiment has a low pressure compressor and a high pressure compressor. Alternatively, the cooling system may have a compressor with an economizer port. The compressor may be placed on the same shaft with the expander 526 and a motor.

Figure 6:
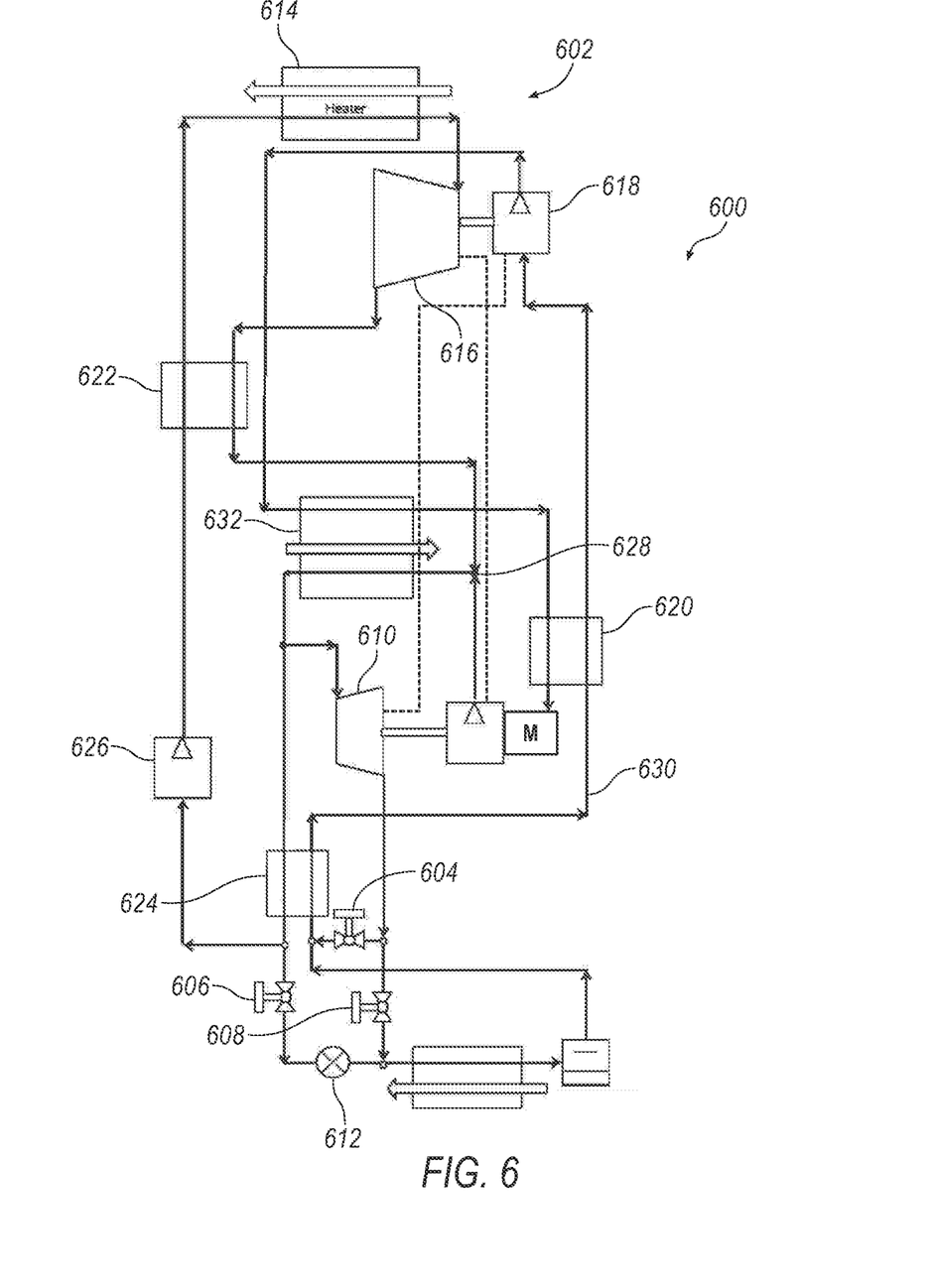
FIG. 6 is an illustration of a cooling system driven in part thermally by a waste heat source.

Referring to FIG. 6, an alternative cooling system 600 operates as described with the disclosed systems above, but with the additional benefit of a thermally driven portion 602 that is driven by waste heat from the aircraft, in one embodiment. The system incorporates power generation circuit and a cooling circuit such as described above. The power generation portion includes a pump 626 (providing that it has liquid or at least sufficiently dense refrigerant at its inlet), optional recuperative heat exchanger 622, a heater 614, an expander 616, and a heat rejection exchanger 632. The heat rejection exchanger 632 is a common component for both circuits as a heat rejection exchanger. Such embodiment provides an opportunity to drive the high pressure compressor stage by the two-phase expander 610 (by placing the high pressure compressor and the two-phase expander on the same shaft) and the low pressure compressor stage 618 by the vapor expander 616 (by placing the low pressure compressor and the vapor expander on the same shaft) without any electrical power input. In one example, the system includes one electrically driven device, pump 626. Alternatively, it is possible to arrange driving the low pressure compressor stage 618 by the two-phase expander 610 and the high pressure compressor stage by the vapor expander 616 (shown as dashed lines). There is an option to place the pump on one shaft with the expander 610 or with the expander 618 in order to avoid or reduce electrical input. Also, there is an option to place the low pressure compressor, the high pressure compressor, the two-phase expander, the vapor expander, and the pump on one common shaft. In addition a motor-generator may be added to the shaft to extract power when cooling capacity demands is reduced.

In another embodiment thermally driven portion 602 derives its heat not as waste heat, but from components in the aircraft or aircraft engine that operate at high temperature. In this case, including a motor-generator instead of a motor may be beneficial. The motor-generator may generate power when the cooling by the evaporator is not needed and cooling of a hot temperature source by the heater 614 is an option. Valves 604, 606, 608 may be operated in the fashion as described in order to selectively operate expansion devices such as expander 610 and expansion device 612, depending on sub-critical, trans-critical, or super-critical operation. However, in this embodiment waste heat from the aircraft is recovered via a heater 614, through which waste heat is passed (i.e., combustion products). Thermally driven portion 602 of system 600 includes expander 616 and a compressor 618, recuperative heat exchangers 620, 622, and 624, and pump 626. That is, in addition to the components of system 200 described with respect to FIG. 2, system 600 includes the additional components described that enable waste heat recovery from the aircraft, leading to higher system cooling output and more efficient operation.

In operation, liquid refrigerant is extracted after having passed through recuperative heat exchanger 624 and pumped via pump 626 through recuperative heat exchanger 622. The refrigerant is passed through heater 614 and the heated, high pressure refrigerant is expanded through expander 616 and power is extracted therefrom to drive compressor 618. Refrigerant that exits expander 616 passes through recuperative heat exchanger 622 and joins refrigerant flow from other portions of the circuit at junction 628. Refrigerant passing to thermally driving portion 602 arrives through refrigerant line 630, passes through recuperative heat exchanger 620, and to compressor 618, where the refrigerant is compressed and passed to heat rejection heat exchanger 632.

Heat rejection exchanger 632 is illustrated as a single device or heat exchanger, but in an alternate embodiment may be two separate heat exchangers (delineated as a dashed line) for power generation and cooling portions of the system, and it is contemplated that the heat rejection is to coolant designated as an arrow that, in the two separate heat exchanger embodiment, passes to each of them.

In such fashion, waste heat from the aircraft is recovered and its energy is available to improve system cooling output and overall system efficiency. Recuperative heat exchangers 620, 622, 624 are available as positioned to jointly heat and cool as refrigerant passes in their respective directions, taking yet more advantage of the waste heat available to the system. Further, it is contemplated that all embodiments illustrated and described herein are controllable via a controller and computer, as described with respect to FIG. 2 above (with controller 224 and computer 226).

In an alternate embodiment, expander 610 is coupled to compressor 618, and compressor 616 is likewise coupled to the HP compressor as illustrated in the alternative provided that the check valve is repositioned accordingly.

In general, computing systems 226 and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX® operating system distributed by International Business Machines of Armonk, N.Y., the Linux® operating system, the Mac® OS X and iOS operating systems distributed by Apple Inc. of Cupertino, Calif., and the Android® operating system developed by the Open Handset Alliance.

Computing devices 226 generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C®, C++®, Visual Basic®, Java Script®, Perl®, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A cooling system comprising:
    a heat exchanger through which a refrigerant flows, and which rejects heat to a fluid;
    an evaporator;
    a recuperative heat exchanger;
    a first circuit having an expansion device;
    a second circuit having an expansion machine coupled to a first compressor, the second circuit split into two additional circuits after exiting the expansion machine, in which one split of the second circuit feeds the evaporator, and the other split of the second circuit bypasses the evaporator and flows in the recuperative heat exchanger opposite a flow direction of the first circuit to cool the refrigerant of the first circuit; and
    a set of valves arranged to direct the refrigerant through the first circuit, the second circuit, or both the first and second circuits based on ambient conditions.

2. The cooling system of claim 1, wherein the cooling system is for an aircraft, and the ambient conditions are defined by an operating condition of the aircraft.

3. The cooling system as claimed in claim 1, further comprising:
    the first compressor configured to compress the refrigerant to a first pressure; and
    the evaporator configured to evaporate the refrigerant;
    wherein the expansion machine is a first turbine that is rotationally coupled to the compressor through a shaft, and the expansion device is an expansion valve.

4. The cooling system as claimed in claim 3, further comprising:
    a second compressor configured to, prior to entering the first compressor, compress the refrigerant to a second pressure that is less than the first pressure; and a second heat exchanger configured to cool the refrigerant prior to entering the first compressor but after exiting the second compressor.

5. The cooling system as claimed in claim 4, further comprising:
an ejector positioned to:
receive the refrigerant from the recuperative heat exchanger as a first flowstream after having passed therethrough in a second direction;
receive the refrigerant from the evaporator as a second flowstream; and
combine the first and second flowstreams and pass a portion of the refrigerant to the recuperative heat exchanger in a first direction and as a gas from a liquid separator.

6. The cooling system as claimed in claim 5, wherein the at least one component of the aircraft is a part of a gas turbine machine that is a primary mover for the aircraft, the part comprising one of a primary mover compressor, a combustor, and a primary mover turbine.

7. The cooling system as claimed in claim 1, wherein the refrigerant is $CO_2$.

8. The cooling system as claimed in claim 1, wherein the refrigerant is in one of a sub-critical, a trans-critical state, and a super-critical state.

9. The cooling system of claim 1, wherein the heat exchanger has refrigerant inlet conditions dependent on ambient conditions.

10. The cooling system of claim 1, further comprising a third circuit having a heater coupled to the first and second circuits, the third circuit including a second expansion machine and the heater configured to receive waste heat from an aircraft, wherein the refrigerant is directed through the heater and the second expansion machine such that the second expansion machine is configured to extract energy from heated refrigerant that exits from the heater.

11. A method of operating a cooling system, the method comprising:
operating a set of valves that cause a refrigerant to:
pass the refrigerant through a heat exchanger;
pass the refrigerant through a recuperative heat exchanger and an evaporator;
direct the refrigerant through a first cooling circuit, a second cooling circuit, or both depending on ambient conditions;
wherein the first cooling circuit includes an expansion device and the second cooling circuit includes an expansion machine; and
split a flow of the refrigerant of the second cooling circuit exiting the expansion machine into two additional circuits, in which one split of the second circuit feeds the evaporator, and the other split of the second circuit bypasses the evaporator and flows in the recuperative heat exchanger opposite a flow direction of the first circuit to cool the refrigerant of the first circuit.

12. The method as claimed in claim 11, further comprising:
compressing the refrigerant in the first compressor to a first pressure;
evaporating the refrigerant in the evaporator; and
cooling the refrigerant in a first fluid cooler;
wherein the expansion device is an expansion valve, and wherein the expansion machine is a first turbine.

13. The method as claimed in claim 12, further comprising:
compressing the refrigerant in a second compressor to a second pressure that is less than the first pressure, prior to the refrigerant entering the first compressor; and
cooling the refrigerant in a second fluid cooler, prior to the refrigerant entering the first compressor but after exiting the second compressor.

14. The method as claimed in claim 13, further comprising:
receiving the refrigerant from the recuperative heat exchanger as a first flow stream after having passed through the first fluid cooler;
receiving the refrigerant from the evaporator as a second flow stream;
combining the first and second flow streams in an ejector; and
passing a portion of the combined flow streams to the recuperative heat exchanger in a first direction and as a gas from a liquid separator.

15. The method as claimed in claim 11, wherein the refrigerant comprises $CO_2$ in one of a sub-critical, a super-critical, and trans-critical state.

16. The method as claimed in claim 11, wherein the heat exchanger is configured having a refrigerant inlet flow that is dependent on ambient conditions.

17. The method as claimed in claim 11, wherein operating the valves further comprises passing the refrigerant through a third circuit having a heater coupled to the first and second circuits, the third circuit including a second expansion device and the heater configured to receive waste heat from an aircraft, wherein the refrigerant is directed through the heater and the second expansion machine such that the second expansion machine is configured to extract energy from heated refrigerant that exits from the heater.

18. An aircraft comprising:
a turbine engine; and
a cooling system for the aircraft comprising:
a heat exchanger through which a refrigerant flows, in which heat is rejected to a fluid;
a set of valves arranged to:
direct the refrigerant through a first circuit having a fluid expansion device; direct the refrigerant through a second circuit having a fluid expansion machine; or
direct the refrigerant through both circuits, based on ambient conditions; and
a third circuit having a heater coupled to the first and second circuits, the third circuit including a second expansion device and the heater configured to receive waste heat from the aircraft, wherein the refrigerant is directed through the heater and the second expansion machine such that the second expansion machine is configured to extract energy from heated refrigerant that exits from the heater.

19. The aircraft as claimed in claim 18, the cooling system further comprising:
a first compressor configured to compress the refrigerant to a first pressure;
an evaporator configured to evaporate the refrigerant; and
a first gas cooler configured to cool the refrigerant.

20. The aircraft of claim 18, wherein:
the fluid machine is a turbine that is rotationally coupled to the first compressor through a shaft; and
the fluid expansion device is an expansion valve.

* * * * *